United States Patent
Aubele et al.

(10) Patent No.: US 7,788,820 B2
(45) Date of Patent: Sep. 7, 2010

(54) METHOD AND DEVICE FOR CONTACTING A SURFACE POINT ON A WORKPIECE

(75) Inventors: Eugen Aubele, Boehmenkirch (DE); Guenter Grupp, Boehmenkirch (DE); Ralf Bernhardt, Aalen (DE); Klaus Bendzulla, Kuenzelsau (DE)

(73) Assignee: Carl Zeiss Industrielle Messtechnik GmbH, Oberkochen (DE)

( * ) Notice: Subject to any disclaimer, the term of this patent is extended or adjusted under 35 U.S.C. 154(b) by 130 days.

(21) Appl. No.: 12/267,123

(22) Filed: Nov. 7, 2008

(65) Prior Publication Data

US 2009/0172962 A1 Jul. 9, 2009

Related U.S. Application Data

(63) Continuation of application No. PCT/EP2007/003788, filed on Apr. 28, 2007.

(30) Foreign Application Priority Data

May 10, 2006 (DE) .................. 10 2006 023 031

(51) Int. Cl.
*G01B 5/004* (2006.01)
(52) U.S. Cl. .......................... 33/556; 33/559
(58) Field of Classification Search .................. 33/556, 33/559, 560
See application file for complete search history.

(56) References Cited

U.S. PATENT DOCUMENTS

| | | | |
|---|---|---|---|
| 4,611,403 A | 9/1986 | Morita et al. | |
| 5,146,691 A * | 9/1992 | McMurtry | 33/559 |
| 5,253,428 A | 10/1993 | McMurtry | |
| 5,339,535 A * | 8/1994 | McMurtry et al. | 33/561 |
| 5,357,684 A | 10/1994 | Lindner et al. | |
| 5,669,152 A * | 9/1997 | McMurtry | 33/559 |
| 5,839,202 A * | 11/1998 | Tezuka et al. | 33/503 |
| 6,058,618 A * | 5/2000 | Hemmelgarn et al. | 33/503 |
| 2009/0172962 A1 * | 7/2009 | Aubele et al. | 33/556 |

FOREIGN PATENT DOCUMENTS

| | | |
|---|---|---|
| DE | 40 27 136 A1 | 3/1992 |
| DE | 35 29 320 C2 | 2/1994 |
| DE | 102 29 824 A1 | 1/2004 |
| DE | 10 2004 007 968 A1 | 9/2005 |
| EP | 1 376 053 A2 | 1/2004 |
| JP | 8-304059 | 11/1996 |
| JP | 9-141815 | 6/1997 |
| JP | 2005-55345 | 3/2005 |

* cited by examiner

Primary Examiner—G. Bradley Bennett
(74) Attorney, Agent, or Firm—Harness, Dickey & Pierce, P.L.C.

(57) ABSTRACT

A probe head having a probe head base and a stylus is provided for contacting a surface point on a workpiece. The stylus is moveable relative to the probe head base and has a defined rest position relative to the probe head base. For the contacting, the probe head is moved relative to the workpiece until the stylus touches the surface point with a defined contacting force. A correction data record representing a hysteresis behavior of the stylus with respect to the rest position is provided, and the contacting force is determined using the correction data record.

14 Claims, 5 Drawing Sheets

METHOD AND DEVICE FOR CONTACTING A SURFACE POINT ON A WORKPIECE

CROSS REFERENCES TO RELATED APPLICATIONS

This application is a continuation of international patent application PCT/EP2007/003788, filed on Apr. 28, 2007 designating the U.S., which international patent application has been published in German language as WO 2007/128444 A1 and claims priority from German patent application DE 10 2006 023 031.0 filed on May 10, 2006. The entire contents of these prior applications are incorporated herein by reference.

BACKGROUND OF THE INVENTION

The present invention relates to a method and a device for contacting a surface point on a workpiece, in particular for determining a spatial coordinate of the surface point. More particularly, the invention relates to the field of coordinate measurement technology, i.e. the one-, two- or three-dimensional measurement of workpieces by means of measurement tools which make it possible to determine spatial coordinates of the workpieces at selected measurement points. A typical coordinate measuring machine has a measuring head which can be moved relative to the workpiece. The measuring head carries a sensor, by means of which the measuring head can be brought into a defined position with respect to a surface point on the workpiece. Often, the surface point is contacted or touched by means of a stylus. Accordingly, the measuring head in such coordinate measuring machines is typically referred to as a contact probe head. The spatial coordinates of the touched surface point can be determined after the contact from the position of the probe head in the measurement volume and, when possible, from the displacement and deformation of the stylus. By contacting a plurality of surface points on a workpiece, it is possible to record geometrical dimensions and shape profiles.

However, the invention is not restricted to coordinate measuring machines in the narrow sense. It may also be used for machine tools or other machines in which a surface point on a workpiece is contacted by means of a stylus, whether for measurement purposes or for other reasons.

For applications requiring a high measurement accuracy, it is necessary to also take into account elastic deformations of the stylus and even of the coordinate measuring machine during the process of contacting. For this purpose, the contacting force, i.e. the force with which the stylus presses on the surface point, need to be known or determined. On the one hand, a small contacting force is desirable so that the elastic deformations on the stylus, the coordinate measuring machine and also the workpiece can be kept small. On the other hand, a certain contacting force is necessary in order to ensure that the stylus touches the selected surface point "correctly". An exactly defined contacting force is also desirable for measuring or contacting highly flexible workpieces, which yield in response to the contacting movement.

Persons skilled in this field know that the defined rest position of a mobile stylus on the probe head base depends up to a certain extent on the prior deflections of the stylus. This is the result of various effects or influences such as friction, magnetic remanence or material stresses. Overall, the stylus has a hysteresis behavior which, although it may be minor, nevertheless has an effect in the case of high measurement accuracies.

Various proposals have been made in order to minimize the effects of the hysteresis behavior. DE 10 2004 007 968 A1 proposes to contact the surface point of the workpiece several times in succession, with different alternating contacting forces being used. In this context, it is disclosed that the setting of the contacting forces is likewise subject to a certain hysteresis. Nevertheless, the proposed method allows to increase the measurement accuracy by averaging the acquired measurement values. A disadvantage of this procedure is however that the surface point has to be contacted several times with varying contacting forces, which increases the measurement time on the one hand and is difficult in the case of highly flexible workpieces on the other hand.

There are a plurality of other proposals for minimizing hysteresis effects by proper mechanical construction of the probe head. Reference is made to DE 35 29 320 C2, DE 40 27 136 A1, U.S. Pat. No. 5,253,428, JP 08-304059 and JP 2005-055345 for example.

DE 102 29 824 A1 proposes a method for operating a coordinate measuring machine which can be used in at least two different operating modes. In a first operating mode the probe head is moved by CNC control, i.e. automatically. In a second operating mode the probe head is moved manually, with an operator operating a control console or the like. It is proposed that contacting of the surface point should be carried out in both operating modes with the same directionality, in order to avoid different measurement results due to different hysteresis effects.

JP 9-141815 discloses to determine control signals for an engraving tool as a function of image data which are acquired from previously engraved positions in order to reduce inaccuracies or errors in the engraving process due to hysteresis effects.

SUMMARY OF THE INVENTION

Against this background, it is an object of the present invention to provide alternative way of minimizing hysteresis effects when contacting a workpiece. It is another object to provide a method and a device for setting and/or displaying the contacting force of a stylus against a workpiece surface with a high accuracy.

According to one aspect of the invention, there is provided a method for contacting a surface point on a workpiece comprising the steps of providing a probe head having a probe head base and a stylus which is moveable relative to the probe head base, the stylus having a defined rest position relative to the probe head base, providing correction data record which represents a hysteresis behavior of the stylus with respect to the rest position, and moving the probe head relative to the workpiece until the stylus touches the surface point with a defined contacting force, wherein the contacting force is determined using the correction data record.

According to another aspect of the invention, there is provided device for contacting a surface point on a workpiece, the device comprising a probe head having a probe head base and a stylus which is moveable relative to the probe head base, the stylus having a defined rest position relative to the probe head base and a hysteresis behavior with respect to the rest position, comprising at least one drive for moving the probe head relative to the workpiece in order to touch the surface point with the stylus and with a defined contacting force, comprising a memory in which a correction data record is stored, which correction data record represents the hysteresis behavior, and comprising a computation unit designed to determine the contacting force as a function of the correction data record.

The new method and the new device thus use a correction data record in which the hysteresis behavior of the stylus is stored. The correction data record is either based on measurement values, which is preferred, or on computationally determined correction values which characterize the hysteresis behavior of the stylus. The correction data record is preferably based on measurement values which have been determined for a corresponding probe head in a previous standardization process. This may be done individually for each probe head, or it is possible to use characteristic measurement values for a family of probe heads of the same type. It is furthermore preferable for the correction data record to be stored permanently in the memory and used in the same way for all contacting operations.

The provision and use of such a correction data record make it possible for hysteresis effects to be substantially corrected computationally. Computational correction of error effects is already used in coordinate measuring machines, for example in order to correct guiding errors caused by lack of straightness and/or perpendicularity of guide paths of the coordinate measuring machine. To date, however, computational correction has not been envisaged for the correction of a hysteresis effects. Rather, prior art attempts have so far been made to minimize a hysteresis effects by a suitable design of the probe head and the mounting of the probe head.

The computational correction of hysteresis effects allows very high accuracies, particularly with respect to the contacting force with which the stylus presses on the surface. In a trial apparatus which the Assignee of the present invention has made, previously unachievable accuracies could be reached when setting the contacting force.

The new method and the new device further have the advantage that the correction of hysteresis effects is in principle independent of the design of the probe head or the special mounting of the stylus. The new method and the new device can therefore be used both for active probe heads and for passive probe heads, the individual correction data records merely needing to be replaced as a function of the probe head used. The basic procedure may however be the same in both cases.

The new device and the new method furthermore make it possible to minimize hysteresis effects in a very economical way, since suitable computation units are often required for controlling the probe head and/or determining the spatial coordinates of the contacted surface point, so that they are already available. In particularly preferred configurations of the invention, the new method may be implemented merely by a software change or supplement. The present invention can therefore be retrofitted very easily and economically even in older coordinate measuring machines.

In another configuration, a desired contacting force is determined by using the correction data record, and the stylus is displaced from its defined rest position in order to generate the defined contacting force as a function of the desired contacting force.

This configuration may be integrated easily and economically into the controller of known coordinate measuring machines, because the existing control mechanisms can be utilized unchanged for setting the defined contacting force. The setpoint specification is merely determined by using the new correction data record. This configuration of the invention is suitable for probe heads with active measuring force application, and in particular for passive probe heads in which the contacting force is set by a defined displacement of the stylus relative to the probe head base.

In another configuration, a force is applied to the stylus by means of an actuator, the actuator being driven as a function of the desired contacting force.

The actuator may in particular be a plunger coil, which is arranged between the probe head base and the stylus so that the displacement of the stylus relative to the probe head base can be set by means of a control current through the coil. This configuration is advantageous because the defined contacting force can be set very exactly and independently of the displacement of the stylus. A large contacting force can also be set even with small displacements, which is advantageous for minimizing the hysteresis effects per se.

In another configuration, the probe head is moved relative to the workpiece as a function of the desired contacting force.

This configuration is especially suitable for passive probe heads, which do not have an actuator of the type mentioned above. In principle, however, it may also be used for active probe heads. With this configuration, the new method can be used easily and inexpensively in conjunction with passive probe heads.

In another configuration, an actual contacting force, which is provided for output on a display, is determined by using the correction data record.

This configuration is advantageous because it allows more accurate display of the contacting force actually being exerted. The user of the new device therefore gets an opportunity for more active control.

In another configuration, the correction data record represents a defined hysteresis force as a function of a displacement of the stylus relative to the probe head base, with the contacting force being determined depending on the defined hysteresis force.

In this configuration, the hysteresis behavior is represented by means of a hysteresis force, which the stylus exerts on the object point when contacting owing to its hysteresis behavior. This configuration is preferred because it allows very rapid realtime correction of the contacting force. Furthermore, the hysteresis behavior of the stylus can be recorded easily and accurately by means of hysteresis forces, for example by using a force sensor as a scanned object.

If a desired contacting force is determined by using the correction data record, the correction value stored in the correction data record, preferably in the form of a hysteresis force, is subtracted from a contacting force desired by the user in order to form the desired contacting force. For the display of the actual contacting force, the correction value (hysteresis force) from the correction data record is added to the measured contacting force. This facilitates setting and display of the actual contacting force while taking the hysteresis behavior of the stylus into account.

In another configuration, the stylus is displaced from its rest position in at least a first and an opposite second spatial direction, with the correction data record comprising a plurality of correction values by means of which the contacting force is determined, an individual correction value being selected as a function of a maximum displacement of the stylus in the first spatial direction, and the selected individual correction value being kept until the stylus is displaced in the second spatial direction.

In this configuration, a correction value is selected from the correction data record after the stylus has been displaced in the first spatial direction. The selected correction value is kept until the stylus is displaced in the opposite second spatial direction. Thus so long as the stylus "only" returns to its rest position after it has been displaced in the first spatial direction, the selected correction value is kept. This configuration allows easy and efficient implementation of the new method and the new device, while the hysteresis behavior of the stylus is corrected with high accuracy. A new correction value is not selected until the stylus moves beyond its rest position in the opposite spatial direction after having been displaced in one spatial direction.

In another configuration, a selected individual correction value is kept until the stylus is displaced by a defined maximum displacement in the second spatial direction.

In this configuration, a selected correction value is kept until it may be assumed that the hysteresis effect has been compensated for or reversed owing to an opposite displacement. Accordingly, the correction values are selected in a threshold value method or a threshold value decision. This allows easy implementation, which requires only few correction values and places less demands on the memory requirement of the new device.

Advantageously, the memory requirement is further reduced by determining individual correction values from the correction data record by interpolation of correction values, which are available in the correction data record.

In an alternative configuration, the selected individual correction value is reduced as soon as the stylus is displaced in the second spatial direction.

In this configuration, a new or adapted correction value is used as soon as the displacement of the stylus undergoes a direction change, irrespective of how far the stylus is displaced in the opposite second spatial direction. With this configuration, it is possible to react more rapidly and more exactly to a modified hysteresis behavior caused by a direction change of the stylus.

In another configuration, the stylus can be moved in at least a first axial direction and a second axial direction extending transversely thereto, a first correction data record being provided for the first axial direction and a second correction data record being provided for the second axial direction, and the contacting force being determined for each of the axial directions by using the associated correction data record. It is particularly preferred if each correction data record represents all axial dependencies of the stylus, i.e. for example the hysteresis behavior of the stylus in the x direction as a function of a previous displacement of the stylus in the x, y and/or z direction.

This configuration allows a very precise correction of the hysteresis behavior. By individual correction data records for each axial direction, axially dependent hysteresis effects can be compensated for easily and with high accuracy.

In another configuration, a deformation of the stylus when contacting the surface point is determined as a function of the contacting force. Preferably, a deformation of the support frame for the probe head and/or the tool is also determined as a function of the contacting force.

This configuration utilizes the inventive correction of contacting forces in order to increase the measuring or positioning accuracy. This configuration is therefore suitable in particular for coordinate measuring machines which are intended to satisfy very stringent requirements in terms of measurement accuracy.

It is to be understood that the features mentioned above and yet to be explained below may be used not only in the combination respectively indicated, but also in other combinations or separately, without departing from the scope of the present invention.

BRIEF DESCRIPTION OF THE DRAWINGS

Exemplary embodiments of the invention are represented in the drawing and will be explained in more detail in the following description.

DESCRIPTION OF PREFERRED EMBODIMENTS

Figure 1:
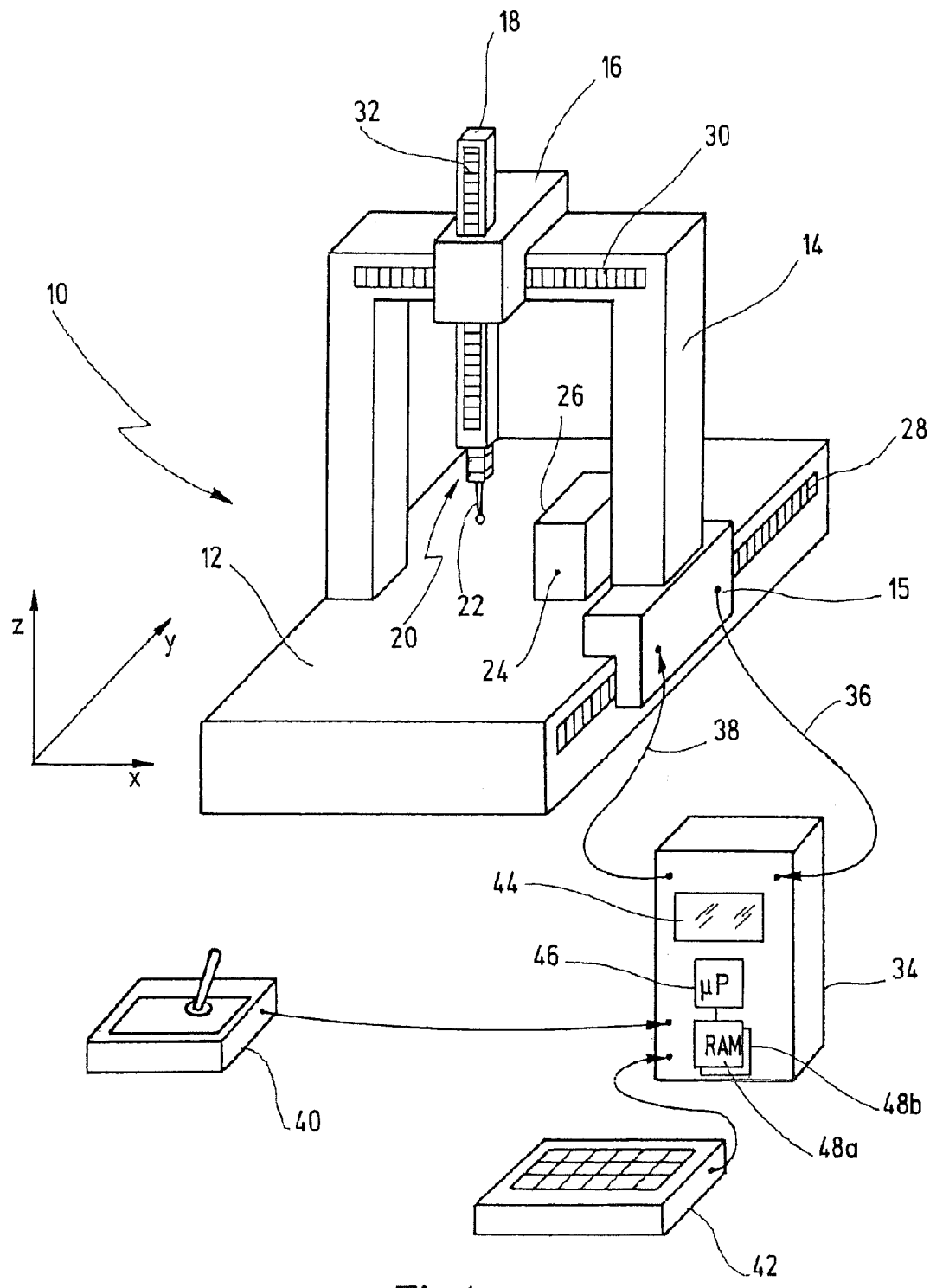
FIG. 1 shows a simplified illustration of a coordinate measuring machine according to an exemplary embodiment of the invention.

In FIG. 1, a coordinate measuring machine as a preferred exemplary embodiment of the new device is denoted in its entirety by reference numeral 10. The coordinate measuring machine 10 is represented here in a gantry design, which is likewise to be understood as an example. The invention is not restricted to a particular frame structure, and it may also be used for example for coordinate measuring machines in a horizontal arm design. Furthermore, the invention may also be used for machines in which a workpiece is moved relative to a stationary probe head, because in the scope of the present invention it is merely the relative movement between the probe head and the workpiece which is important.

The coordinate measuring machine 10 has a base 12, on which a gantry 14 with a drive 15 is arranged. The gantry 14 can be moved by means of drive 15 along an axial direction, which is customarily referred to as the y axis.

A carriage 16, which can be moved in the x direction, is arranged on the upper bridge of gantry 14. The carriage 16 bears a ram 18, which can be moved in the z direction. At the free lower end of ram 18, there is a probe head 20 including a stylus 22. At its free end, stylus 22 has a probe ball 23 (FIG. 2) which is used to contact a surface point 24 on a workpiece 26.

Reference numerals 28, 30, 32 denote linear scales which are arranged parallel to the axial directions of the coordinate measuring machine 10. For example, these are glass scales which can be read by means of suitable sensors (not represented here) in order to determine the movement positions of gantry 14, carriage 16 and ram 18. By means of these measurement values, it is possible to determine the position of the probe head 20 in the measurement volume of the coordinate measuring machine 10. The spatial coordinates of a contacted surface point 24 can be determined from the position of the probe head.

Reference numeral 34 denotes an evaluation and control unit, which is connected by lines 36, 38 to the drives and sensors of the coordinate measuring machine 10. In this exemplary embodiment, the evaluation and control unit 34 is furthermore connected to a control console 40 and a keypad 42. The control console 40 allows manual control of the coordinate measuring machine 10. The keypad 42 makes it possible to input operating parameters and select measurement programs etc.

The control unit 34 here has a display 44, on which inter alia measurement results and parameter values can be output. It furthermore has a processor 46 and a memory 48, which is represented here in a simplified fashion with two memory ranges 48a, 48b. Correction data records, by means of which hysteresis effects of the stylus can be minimized when contacting the surface point 24, are stored in the memory ranges 48a, 48b. In the preferred exemplary embodiment, a correction data record is stored for each axial direction in which the stylus 22 can be displaced.

Figure 2:
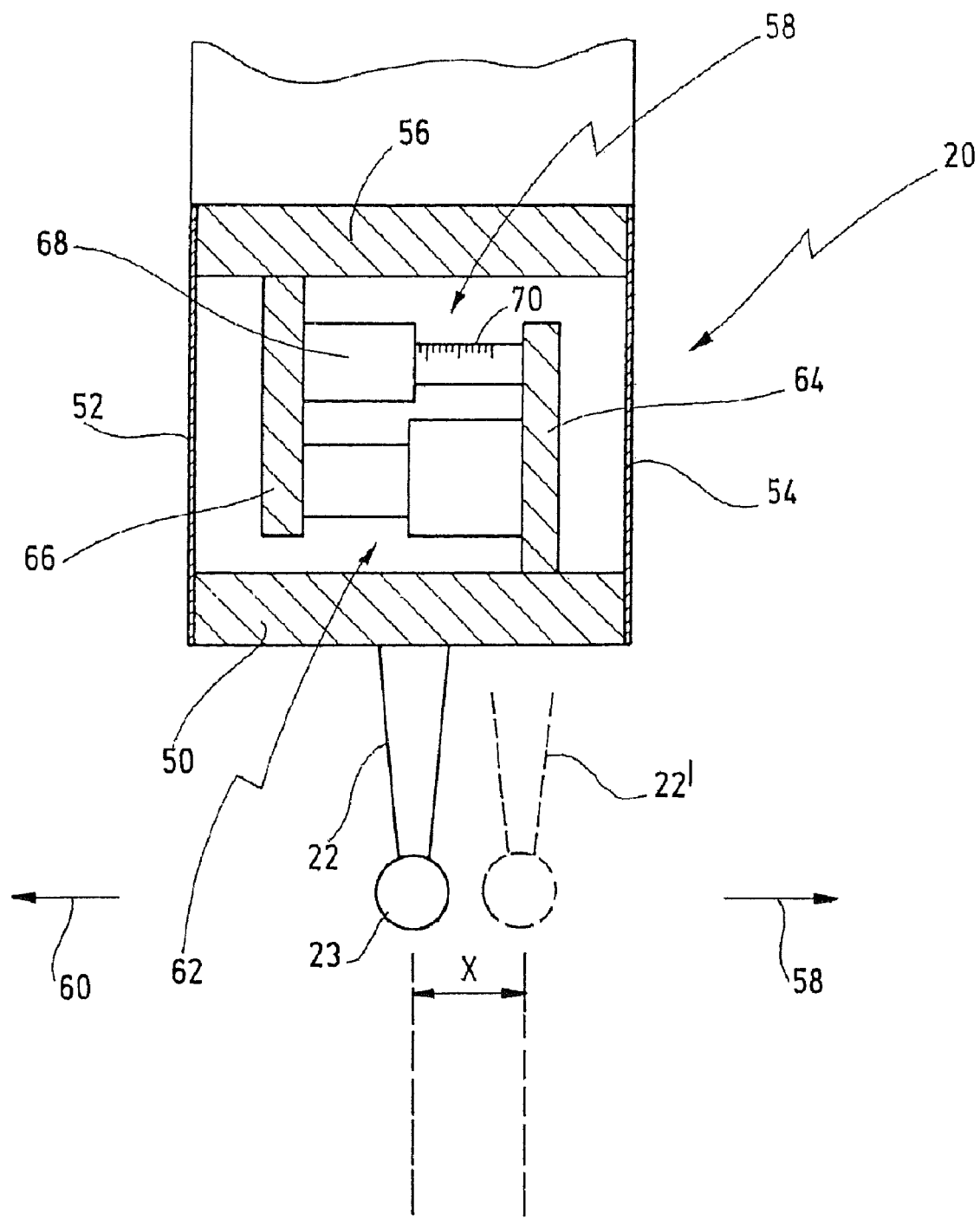
FIG. 2 shows a simplified illustration of a probe head of the coordinate measuring machine in FIG. 1.

FIG. 2 shows the probe head 20 of the coordinate measuring machine 10 with further details, although in a highly simplified representation.

Stylus 22 is arranged on a mobile part 50, which is connected to a probe head base 56 by two leaf springs 52, 54. Owing to the leaf springs 52, 54, the mobile part 50 including stylus 22 can move relative to the probe head base 56, with two mutually opposite movement directions being indicated by arrows 58, 60.

Persons skilled in this field will see that the probe head 20 represented in FIG. 2 makes it possible to displace the stylus 22 in only one axial direction 58, 60, which is due to the simplified representation. Further leaf springs 52, 54 may be provided for deployment of the stylus 22 in the two other axial directions, as it is known to persons skilled in this field.

Reference numeral 62 denotes an actuator, by means of which part 50 can be displaced relative to the probe head base 56. In the present exemplary embodiment, actuator 62 is a plunger coil which is arranged between two limbs 64, 66. Limb 64 is connected to mobile part 50, and limb 66 is connected to probe head base 56. The actuator 62 is capable of pressing the limbs 64, 66 apart or pulling them together, so that the stylus 22 with the part 50 is moved in the spatial direction 58 or in the spatial direction 60.

Reference numeral 68 denotes a sensor, which is also arranged between the two limbs 64, 66. The sensor 68 is represented here with a scale 70, which makes it possible to record the current displacement X of stylus 22 (represented by reference numeral 22') metrologically. Sensor 68 may be a plunger coil, a Hall sensor, an optical sensor or another suitable position or length sensor.

Persons skilled in this field will see that owing to the actuator 62, the probe head 20 is an active probe head in which stylus 22 can be displaced by means of the actuator 62 in order to generate a defined contacting force. As an alternative, the invention may also be used for passive probe heads which do not have an actuator 62.

Figure 3:
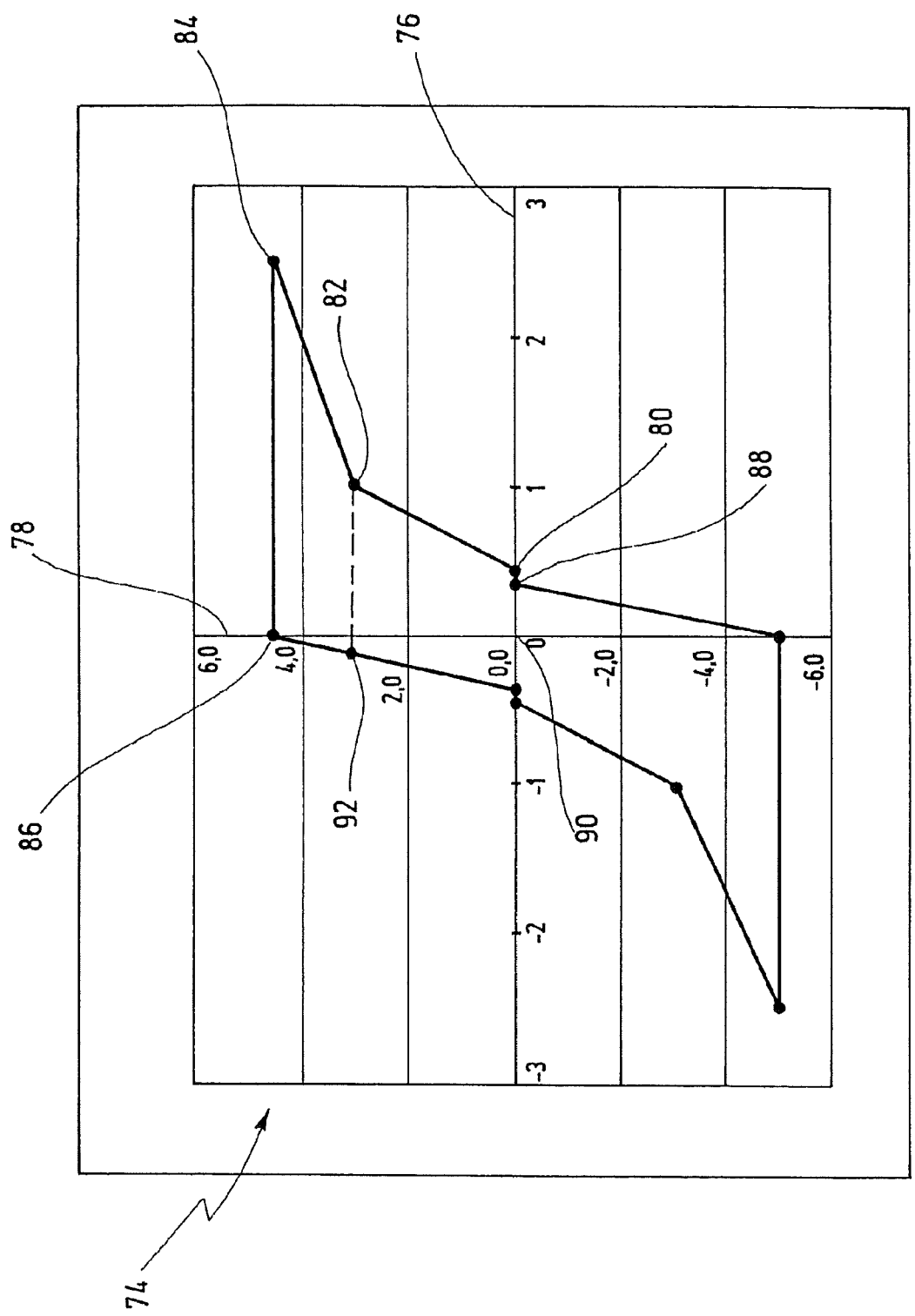
FIG. 3 shows a graphical illustration of a correction data record, which is stored in the coordinate measuring machine in FIG. 1.

In FIG. 3, a correction data record, which is stored in memory 48 of the control unit 34, is denoted in its entirety by reference numeral 74. The correction data record 74 is represented here in the form of a hysteresis curve. The displacements of the stylus 22 in the movement directions 58, 60 are indicated on the abscissa 76 of the underlying coordinate system. Indicated on ordinate 78 are the hysteresis forces which the stylus 22 exerts on a surface point 24 of a workpiece 26 after a corresponding displacement. In the exemplary embodiment represented, the displacements of the stylus 2 are indicated in mm on the abscissa 76. The hysteresis forces on ordinate 78 are indicated in mN.

Reference numerals 80, 82, 84, 86, 88 denote various correction values of the correction data record 74. The indicated correction values have been determined metrologically as sampling points of the correction data record 74, as explained below with respect to FIG. 5. Furthermore, the indicated correction values (together with other correction values not explicitly referred to here) are stored in the memory 48 of the control unit 34. Correction values lying between the stored correction values are advantageously determined through interpolation by the control unit 34.

The correction data record 74 in FIG. 3 is indicated by way of example for displacements of the stylus 22 in the x direction (negative and positive). It is to be understood that similar correction data records are also stored for the other two axial directions y and z in the memory 48 of the control unit 34.

The contacting forces, with which the stylus 22 contacts a surface point 24 on the workpiece 26, are corrected as follows by means of the correction data record 74. After the first or any new setting up of the coordinate measuring machine 10, it is assumed that the stylus is in a hysteresis-free state. No correction is initially carried out until the stylus 22 is displaced for the first time by 0.5 mm (or more) from its rest position, which corresponds to the coordinate origin 90. Now let it be assumed that the stylus 22 is displaced by 1 mm in the positive x direction. For such an displacement, a hysteresis force of about 3 mN can be read from the correction data record 74. All subsequent contacting forces are corrected with this correction value (reference numeral 82) until the stylus 22 is displaced more than 1 mm in the positive x direction or until the stylus 22 is displaced by 0.2 mm in the negative x direction (reference numeral 92). In the former case, the correction value "migrates" on the curve 74 in the direction of the correction value 84. In the latter case, the correction value 82 is kept until the stylus reaches the point 92 on the curve 74.

As an alternative to this, the correction value (i.e. here the hysteresis force of 3 mN) may already be reduced when stylus 22 is displaced in the negative x direction but has not yet reached point 92 on curve 74. For example, a percentage reduction of the previously selected correction value 82 may be carried out as a function of how far the stylus 22 has been displaced in the negative x direction.

As may be seen from the curve profile of the correction data record 74, the maximum correction is about 4.5 mN here (correction values 84). Even if the stylus 22 is displaced by more than 2.5 mm, no stronger correction of the contacting force takes place here.

As may furthermore be seen from the curve profile in FIG. 3, the correction value 88 which corresponds to a contacting force correction of zero (no correction, or hysteresis force equal to zero) lies a little before the correction value 80 on the abscissa 76. Such a curve profile is advantageous because it ensures that the correction of the contacting force is reduced or withdrawn early and, in contrast to this, does not begin until later. This will avoid too strong a correction, which in its turn may generate measurement errors.

Figure 4:
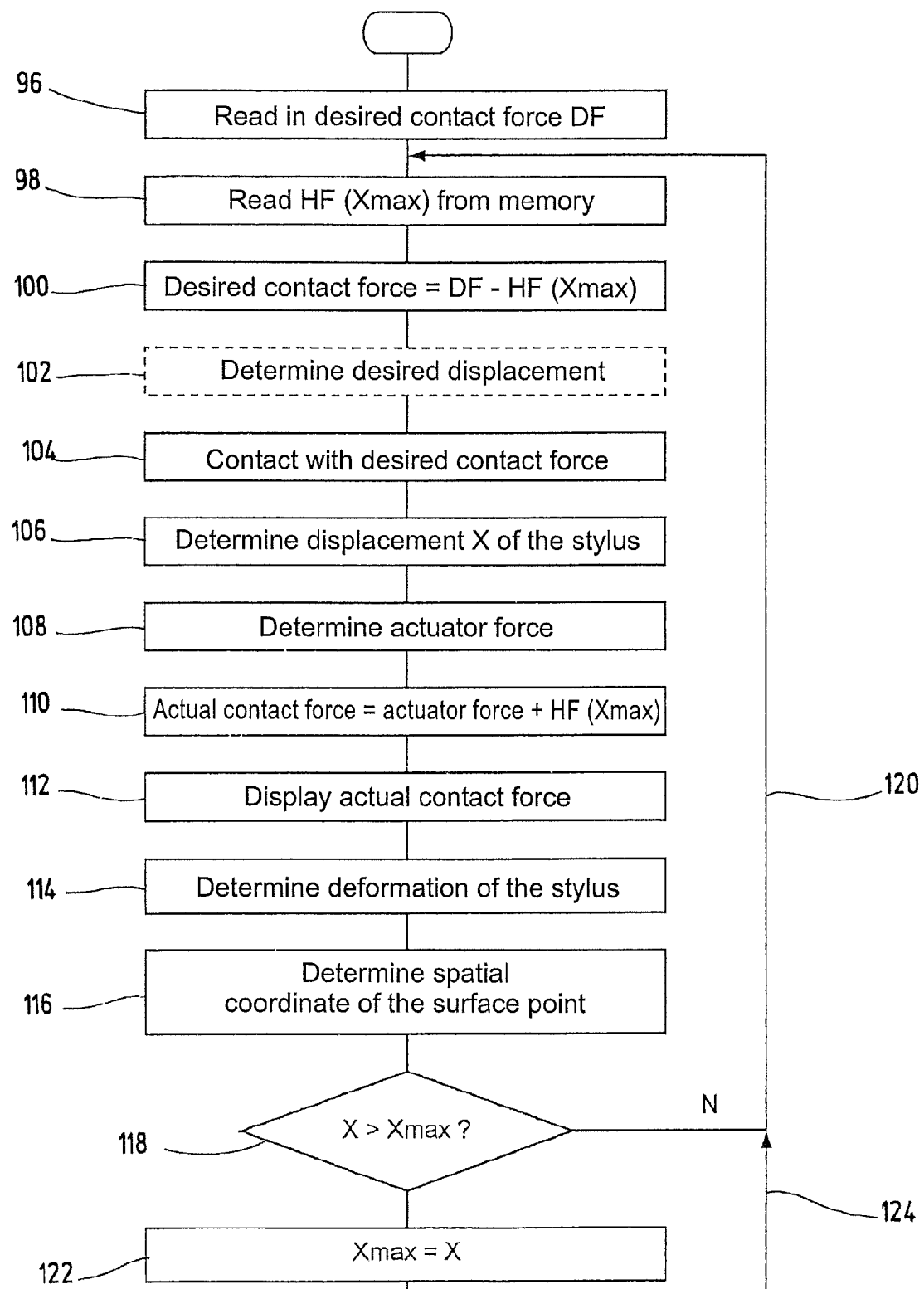
FIG. 4 shows a simplified flow chart to explain an exemplary embodiment of the method according to the invention.

FIG. 4 shows a preferred exemplary embodiment of the new method by means of a simplified flow chart. According to step 96, the contacting force DF desired by the user is initially read in as a parameter value. The user can input the desired contacting force DF into the controller 34 by means of keypad 42.

At the start of the measurement run, according to step 98, the hysteresis force HF ($X_{max}$) is read from the memory 48. In other words, a suitable correction value is taken from the correction data record 74 as a function of a previously detected displacement of the stylus 22. After setting up the coordinate measuring machine 10, a correction value HF=0 is initially used.

Subsequently, according to step 100, a desired contacting force is calculated as the difference between the desired contacting force DF and the hysteresis force HF from the correction data record 74. In other words, the desired contacting force is reduced by the hysteresis force, which exists owing to hysteresis effects. If the probe head is a passive probe head, according to step 102 a setpoint displacement of the stylus 22 is determined as a function of the desired contacting force. In the case of an active probe head, the actuator 62 is driven with the desired contacting force as a default value.

According to step 104, the surface point 24 is scanned with the desired contacting force, the actual contacting force corresponding to the desired contacting force DF owing to the existing hysteresis force.

According to step 106, the displacement X of the stylus 22 is determined. The displacement X is required both for determining the X spatial coordinate of the surface point 24 and for the inventive correction of the contacting force.

According to step 108, in the case of an active probe head, the contacting force generated by the actuator 62 is furthermore determined. If a plunger coil is used as the actuator, the current which flows through the plunger coil may for example be measured.

According to step 110, the actual contacting force is determined as the sum of the metrologically recorded actuator force and the hysteresis force HF. It is to be understood that the differencing in step 100 and the summing in step 110 are carried out with the correct sign, the signs being selected here according to the representation in FIG. 3.

According to step 112, the actual contacting force may be displayed on the display 44. According to step 114, a deformation of the stylus 22 is furthermore determined by means of the actual contacting force. Subsequently, according to step 116, the spatial coordinate of the scanned surface point 24 is determined, the deformation of the stylus 22 preferably being taken into account based on the actual contacting force. The spatial coordinate which is found may be output on the display 44.

According to step 118, a first decision is made whether the displacement of the stylus 22 when contacting the surface point 24 was greater than the most recent maximum displacement $X_{max}$ in the same spatial direction. If this is not the case, according to loop 120 the last correction value used is kept for the contacting force. Otherwise, according to step 122, the most recent displacement X is taken as a new maximum $X_{max}$, and according to step 98 a new correspondingly adapted correction value is selected from the coordinate data record 74. Subsequently, according to loop 124, the next measurement process is carried out by using the new correction value.

Figure 5:
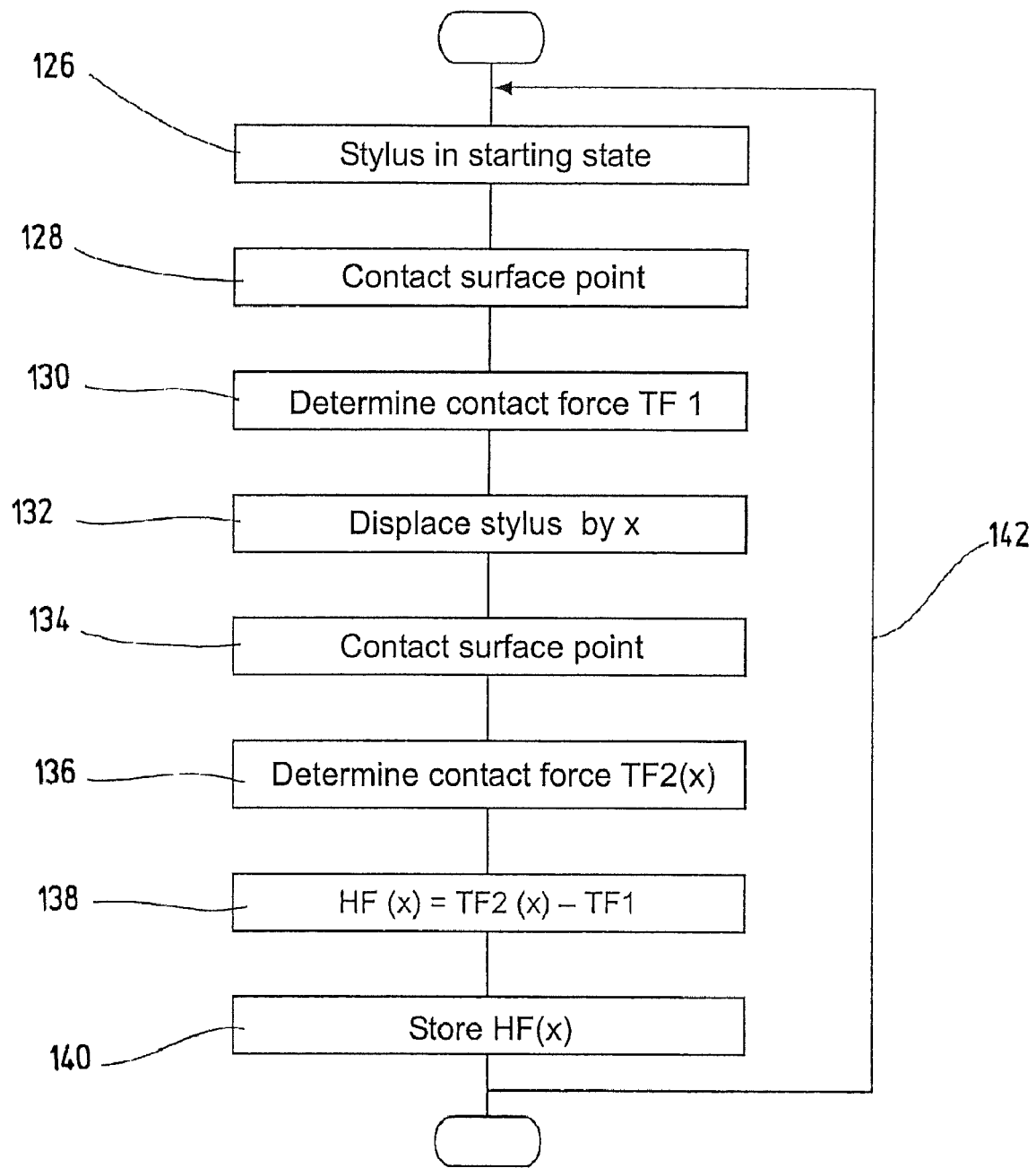
FIG. 5 shows a simplified flow chart to explain a method for recording the correction data record of FIG. 3.

FIG. 5 shows a simplified flow chart to explain an exemplary embodiment, by means of which the correction data record 74 in FIG. 3 can be recorded.

According to step 126, the stylus 22 is initially set into a starting state, which is assumed to be hysteresis-free. Subsequently, according to step 128, a surface point on a force sensor (not represented here) is contacted. The force sensor acts as a calibration workpiece. By means of the force sensor, according to step 130 a first contacting force TF1 is determined. The contacting force TF1 is used as a reference value for an (at least assumed) hysteresis-free displacement.

According to step 132, the stylus is subsequently displaced by a value x in one spatial direction. Subsequently, the same surface point on the force sensor is contacted again (step 134), and according to step 136 the contacting force TF2(x) is determined. Typically, the contacting forces TF1 and TF2(x) differ from one another, which is a result of the hysteresis behavior of the stylus 22.

According to step 138, the difference between the contacting forces TF2(x)-TF1 is stored as a hysteresis force HF(x) i.e. as a correction value in the correction data record 74 (step 140). Subsequently, according to loop 142, a next correction value of the correction data record 74 is determined.

Advantageously, the correction data record 74 with the correction values 80-88 is recorded in a calibration process and stored permanently in the memory 48 of the coordinate measuring machine 10, so that an identical correction data record 74 is used for all subsequent contacting operations.

What is claimed is:

1. A method for contacting a surface point on a workpiece comprising the steps of
providing a probe head having a probe head base and a stylus which is moveable relative to the probe head base, the stylus having a defined rest position relative to the probe head base,
providing correction data record which represents a hysteresis behavior of the stylus with respect to the rest position, and
moving the probe head relative to the workpiece until the stylus touches the surface point with a defined contacting force,
wherein the contacting force is determined using the correction data record.

2. The method of claim 1, wherein a desired contacting force is determined by using the correction data record, and the stylus is displaced from its defined rest position as a function of the desired contacting force in order to generate the defined contacting force.

3. The method of claim 2, wherein a force is applied to the stylus by means of an actuator which is driven as a function of the desired contacting force.

4. The method of claim 2, wherein the probe head is moved relative to the workpiece as a function of the desired contacting force.

5. The method of claim 1, wherein an actual contacting force is determined by using the correction data record, and the actual contacting force is provided for output on a display.

6. The method of claim 1, wherein the correction data record represents a defined hysteresis force as a function of a deployment of the stylus relative to the probe head base, with the contacting force being determined as a function of the defined hysteresis force.

7. The method of claim 1, wherein the stylus is displaced from its rest position in at least a first and an opposite second spatial direction, with the correction data record comprising a plurality of correction values by means of which the contacting force is determined, wherein an individual correction value is selected depending on a maximum deployment of the stylus in the first spatial direction, and the selected individual correction value is kept until the stylus is displaced in the second spatial direction.

8. The method of claim 7, wherein the selected individual correction value is kept until the stylus is displaced by a defined maximum displacement in the second spatial direction.

9. The method of claim 7, wherein the selected individual correction value is reduced as soon as the stylus is displaced in the second spatial direction.

10. The method of claim 1, wherein the stylus is moveable in at least a first and a second axial direction extending transversely to the first axial direction, with a first correction data record being provided for the first axial direction, a second correction data record being provided for the second axial direction, and the contacting force being determined for each of the axial directions by using the first or second correction data record.

11. The method of claim 1, wherein a deformation of the stylus when contacting the surface point is determined as a function of the contacting force.

12. The method of claim 1, wherein the correction data record is recorded by contacting a force sensor with the stylus a plurality of times, with the stylus being displaced between subsequent contacts, and by determining differences in the contacting forces of each contact with the force sensor.

13. The method of claim 1, wherein a spatial coordinate of the surface point is determined as a function of the contacting force.

14. A device for contacting a surface point on a workpiece, the device comprising:
a probe head having a probe head base and a stylus which is moveable relative to the probe head base, the stylus having a defined rest position relative to the probe head base and a hysteresis behavior with respect to the rest position, and
at least one drive for moving the probe head relative to the workpiece in order to touch the surface point with the stylus and with a defined contacting force,
a memory in which a correction data record is stored, which correction data record represents the hysteresis behavior, and
a computation unit designed to determine the contacting force as a function of the correction data record.

* * * * *